(12) United States Patent
Tomoda

(10) Patent No.: US 10,957,345 B2
(45) Date of Patent: Mar. 23, 2021

(54) MAGNETIC DISK DEVICE AND WRITE PROCESSING METHOD

(71) Applicants: Kabushiki Kaisha Toshiba, Tokyo (JP); Toshiba Electronic Devices & Storage Corporation, Tokyo (JP)

(72) Inventor: Yusuke Tomoda, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/560,512

(22) Filed: Sep. 4, 2019

(65) Prior Publication Data

US 2020/0279577 A1 Sep. 3, 2020

(30) Foreign Application Priority Data

Feb. 28, 2019 (JP) .............................. JP2019-036486

(51) Int. Cl.
| | |
|---|---|
| *G11B 5/09* | (2006.01) |
| *G11B 5/127* | (2006.01) |
| *G11B 20/12* | (2006.01) |
| *G11B 5/31* | (2006.01) |
| *G11B 5/012* | (2006.01) |
| *G11B 5/55* | (2006.01) |

(52) U.S. Cl.
CPC ............ *G11B 5/1278* (2013.01); *G11B 5/012* (2013.01); *G11B 5/312* (2013.01); *G11B 5/315* (2013.01); *G11B 5/3116* (2013.01); *G11B 5/5526* (2013.01); *G11B 20/1217* (2013.01); *G11B 2020/1238* (2013.01)

(58) Field of Classification Search
None
See application file for complete search history.

(56) References Cited

U.S. PATENT DOCUMENTS

| | | | |
|---|---|---|---|
| 7,486,460 B2 | 2/2009 | Tsuchinaga et al. | |
| 8,456,967 B1* | 6/2013 | Mallary ............... | G11B 5/1278 369/13.33 |
| 8,964,332 B1* | 2/2015 | Katada .................. | G11B 5/3116 360/125.3 |
| 10,037,769 B1 | 7/2018 | Tomoda et al. | |
| 2009/0052095 A1* | 2/2009 | Yamada ............... | G11B 5/3146 360/324 |
| 2009/0080120 A1* | 3/2009 | Funayama ........... | G11B 5/1278 360/319 |

(Continued)

FOREIGN PATENT DOCUMENTS

JP 2018-147540 A 9/2018

*Primary Examiner* — Peter Vincent Agustin
(74) *Attorney, Agent, or Firm* — White & Case LLP

(57) ABSTRACT

According to one embodiment, a magnetic disk device includes a disk, a head including a main magnetic pole having a first end and a second end opposite to the first end in a radial direction of the disk, a write shield facing the main magnetic pole with a gap, and an assist element provided in the gap and at a position where a first distance between the first end and the assist element and a second distance between the second end and the assist element are different from each other, and a controller which controls a voltage applied to the assist element according to a shingled write direction in which a second track is overwritten on a first track.

3 Claims, 8 Drawing Sheets

(56) References Cited

U.S. PATENT DOCUMENTS

| | | | |
|---|---|---|---|
| 2011/0273800 A1* | 11/2011 | Takano | G11B 5/315 360/125.12 |
| 2012/0126905 A1* | 5/2012 | Zhang | G11C 11/1675 331/94.1 |
| 2012/0154952 A1* | 6/2012 | Yamada | G11B 5/02 360/125.12 |
| 2012/0250174 A1 | 10/2012 | Sueishi et al. | |
| 2014/0063658 A1* | 3/2014 | Shimizu | G11B 5/314 360/234.5 |
| 2015/0332711 A1* | 11/2015 | Urakami | G11B 5/3113 360/99.08 |
| 2015/0380022 A1* | 12/2015 | Koui | G11B 5/3133 360/99.08 |
| 2016/0225392 A1* | 8/2016 | Takeo | G11B 5/3166 |
| 2018/0261241 A1 | 9/2018 | Narita et al. | |

* cited by examiner

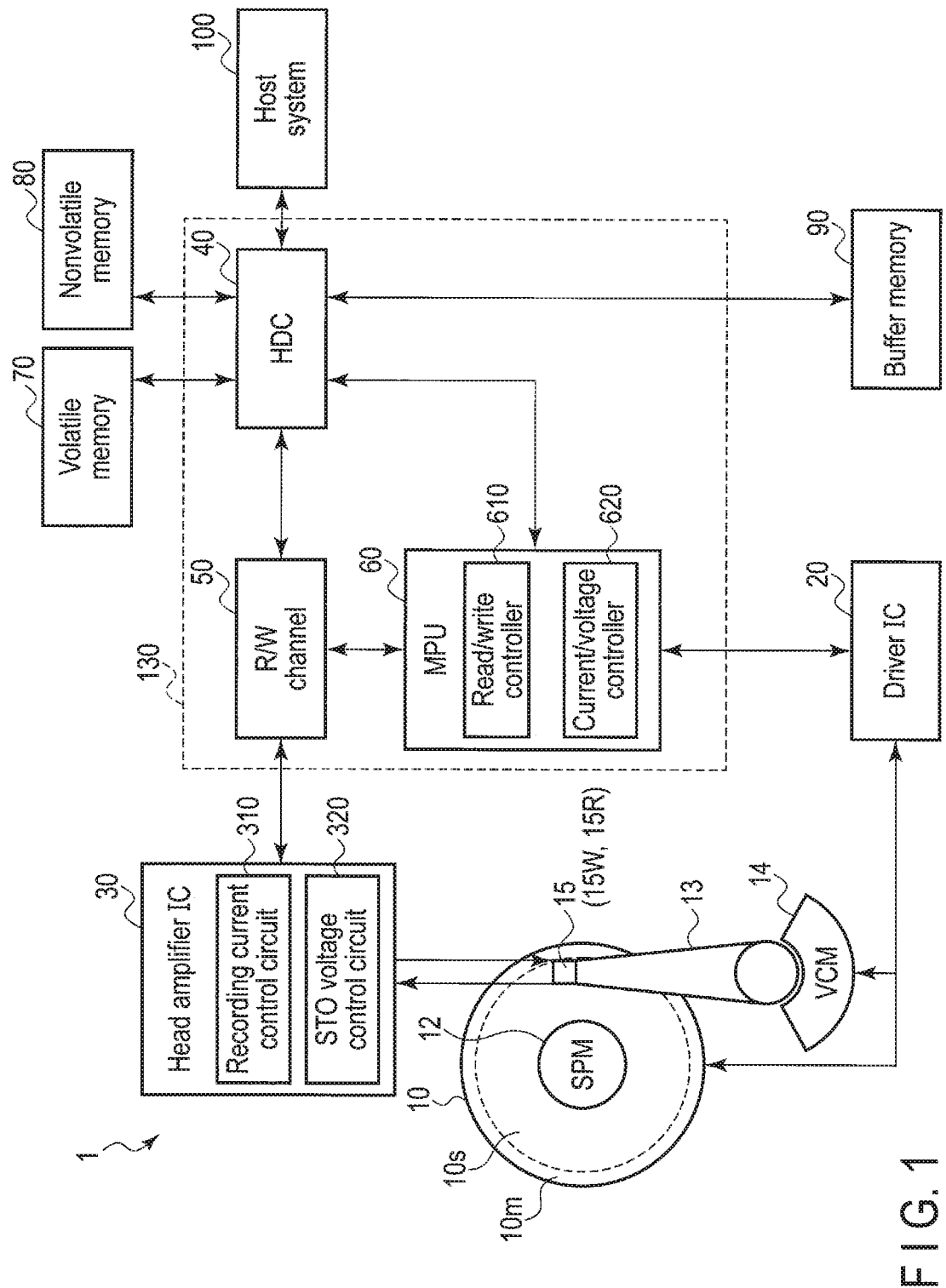
F I G. 1

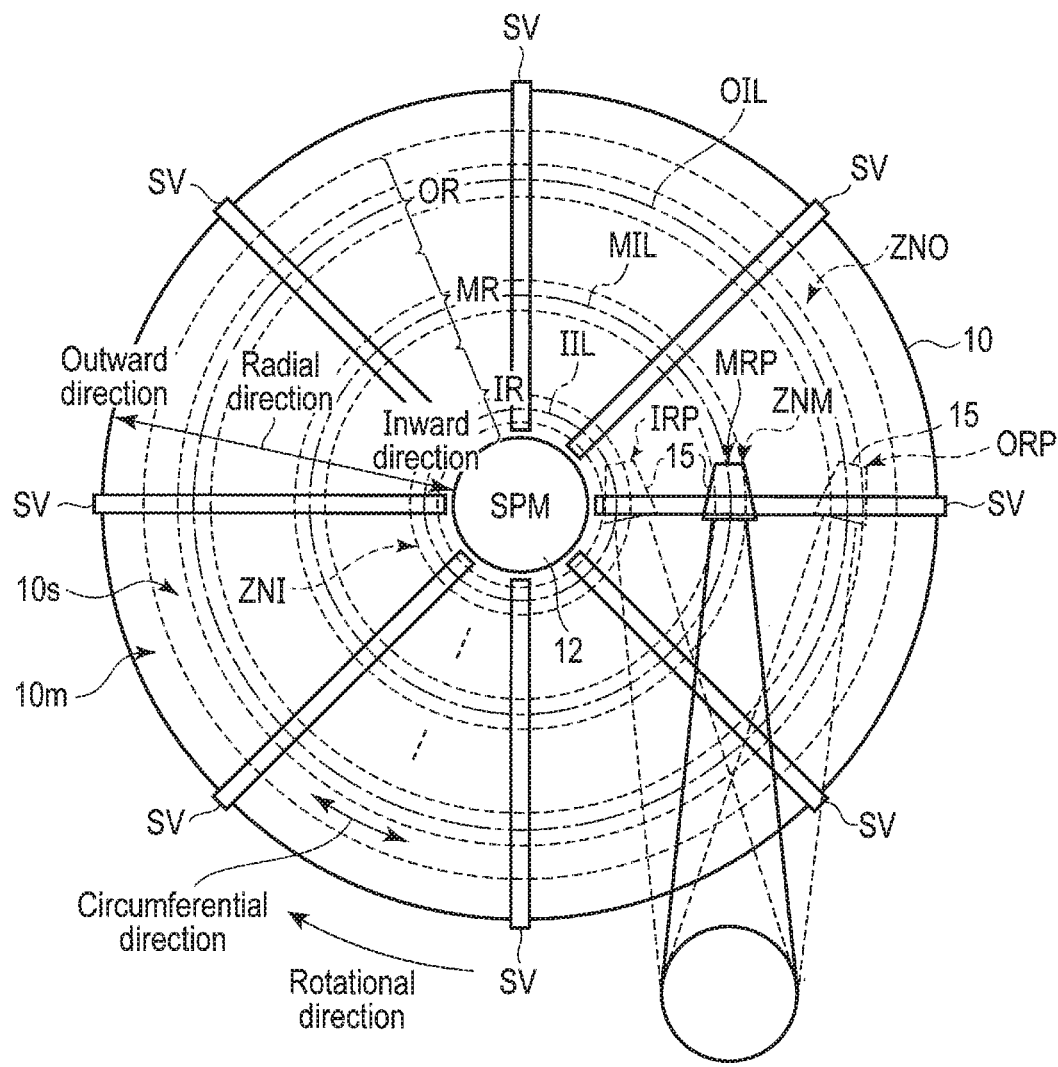
F I G. 2

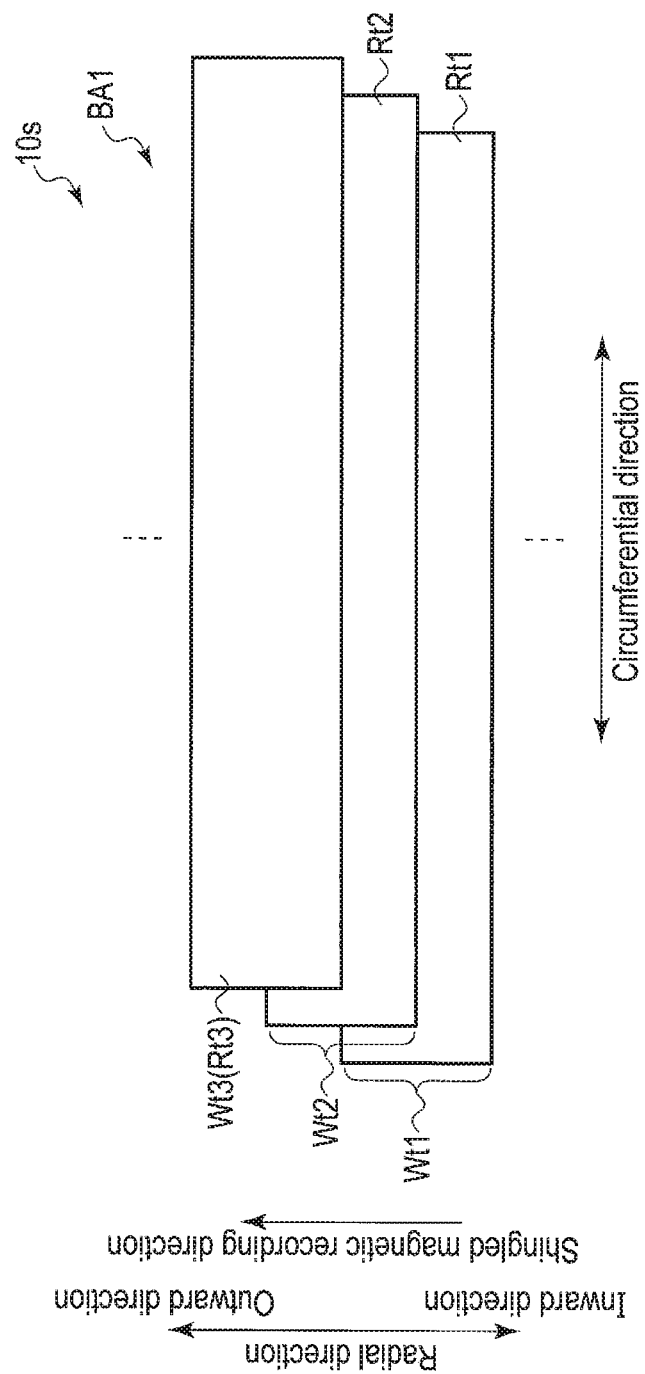
F I G. 4A

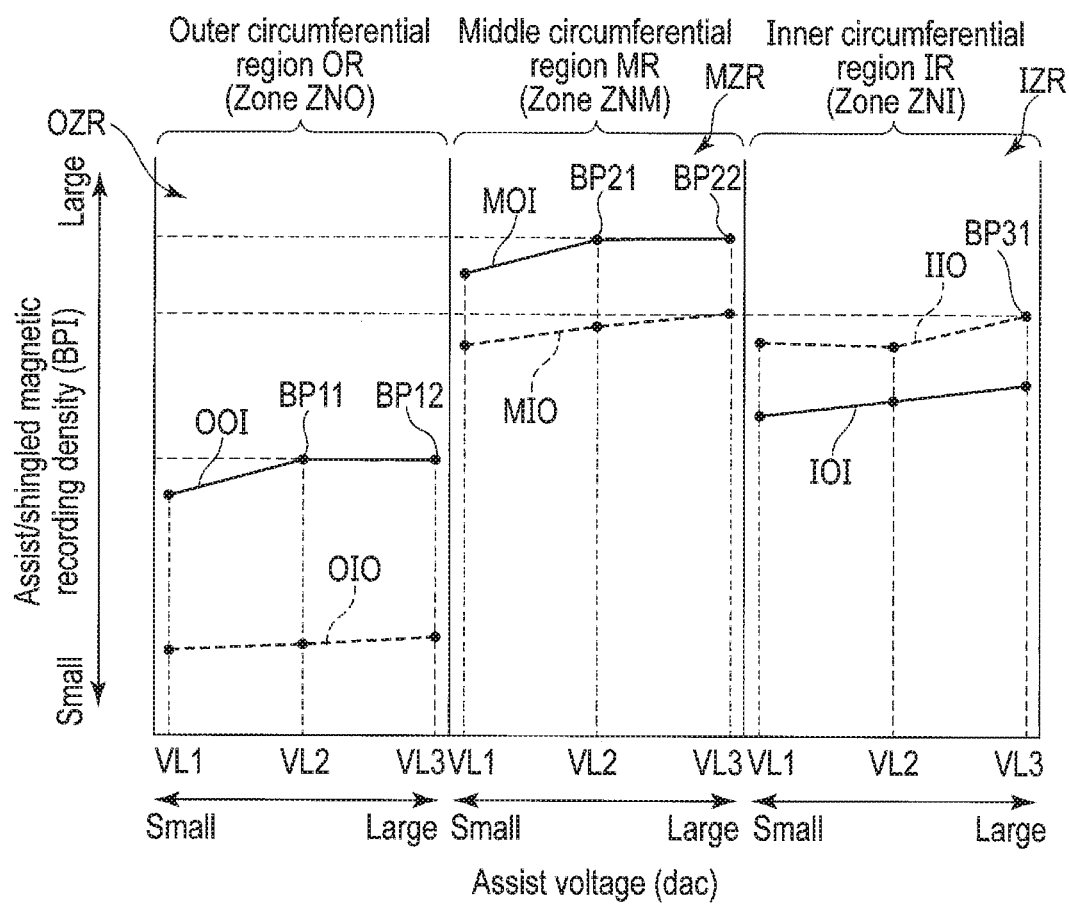
F I G. 6

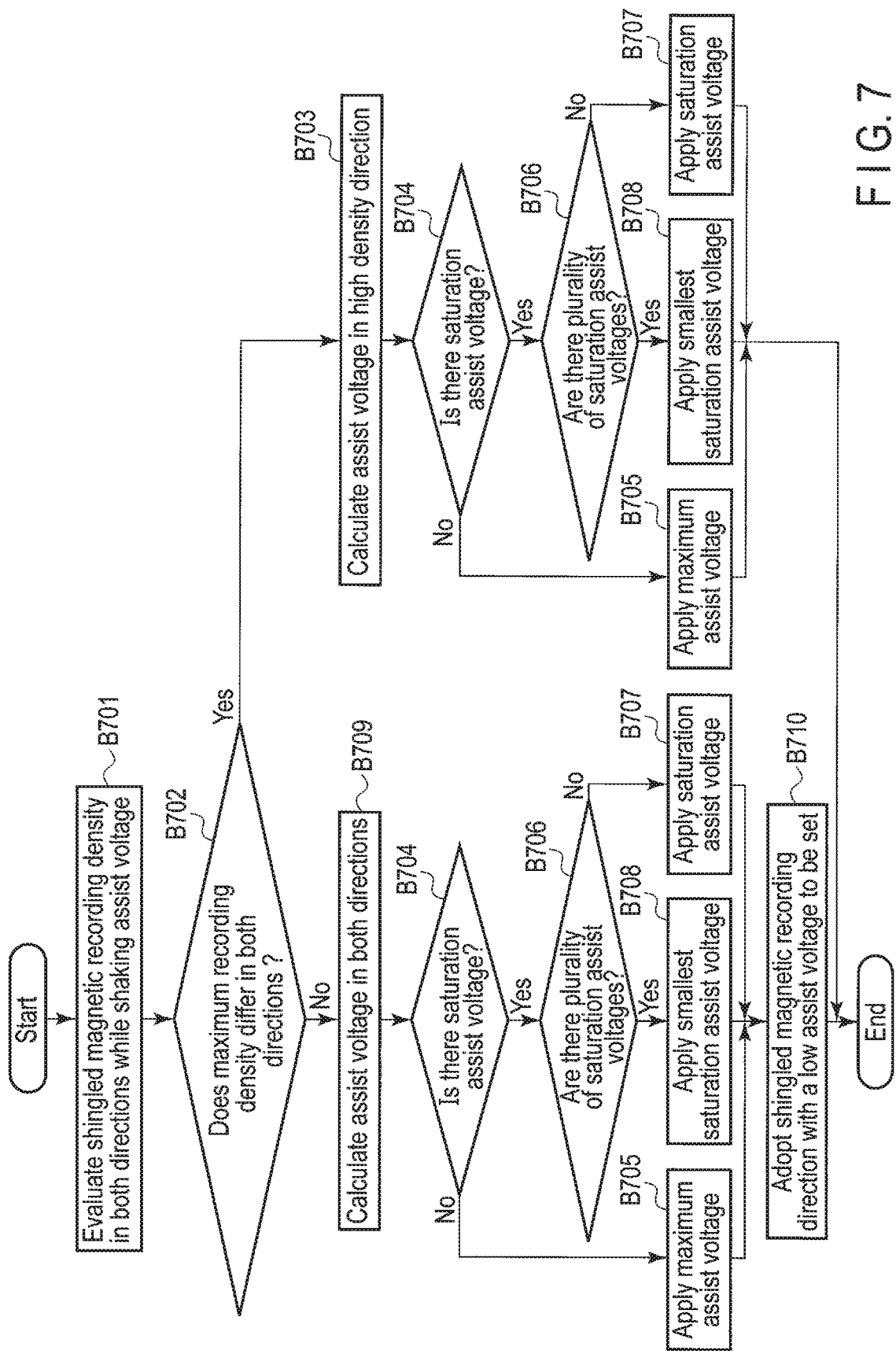
F I G. 7

MAGNETIC DISK DEVICE AND WRITE PROCESSING METHOD

CROSS-REFERENCE TO RELATED APPLICATIONS

This application is based upon and claims the benefit of priority from Japanese Patent Application No. 2019-036486, filed Feb. 28, 2019, the entire contents of which are incorporated herein by reference.

FIELD

Embodiments described herein relate generally to a magnetic disk device and a write processing method.

BACKGROUND

In order to realize high recording density and high recording capacity of a magnetic disk device, high frequency assist recording and shingled write magnetic recording (SMR) (or shingled write recording (SWR)) have been developed. The high frequency assist recording is a technology that uses a magnetic head having a recording magnetic pole (main magnetic pole) excited by application of a recording current to generate a recording magnetic field and a high frequency oscillator, and reduces a coercive force of a portion of a disk, to which a high frequency magnetic field is applied, by applying, to the disk, a high frequency magnetic field generated by energizing the high frequency oscillator. There is a possibility that the high frequency magnetic field applied to the disk from the high frequency oscillator may be deviated from the recording magnetic field applied to the disk from the main magnetic pole.

Meanwhile, the shingled magnetic recording is a technology that overwrites a next track on a portion of a particular track when data is written to a magnetic disk. In the shingled magnetic recording, the quality of data at the end portion of the track in the track width direction can greatly affect the recording density of the disk.

BRIEF DESCRIPTION OF THE DRAWINGS

FIG. 1 is a block diagram illustrating a structure of a magnetic disk device according to an embodiment.

FIG. 2 is a schematic view illustrating an example of the arrangement of heads with respect to a disk according to the present embodiment.

FIG. 4A is a schematic view illustrating an example of a band area including a track group written with an outward direction as a shingled recording direction.

FIG. 6 is a view illustrating an example of the change in assist/shingled recording density with respect to an assist voltage for each particular radius area.

FIG. 7 is a flowchart illustrating an example of write processing according to the present embodiment.

DETAILED DESCRIPTION

Figure 3:
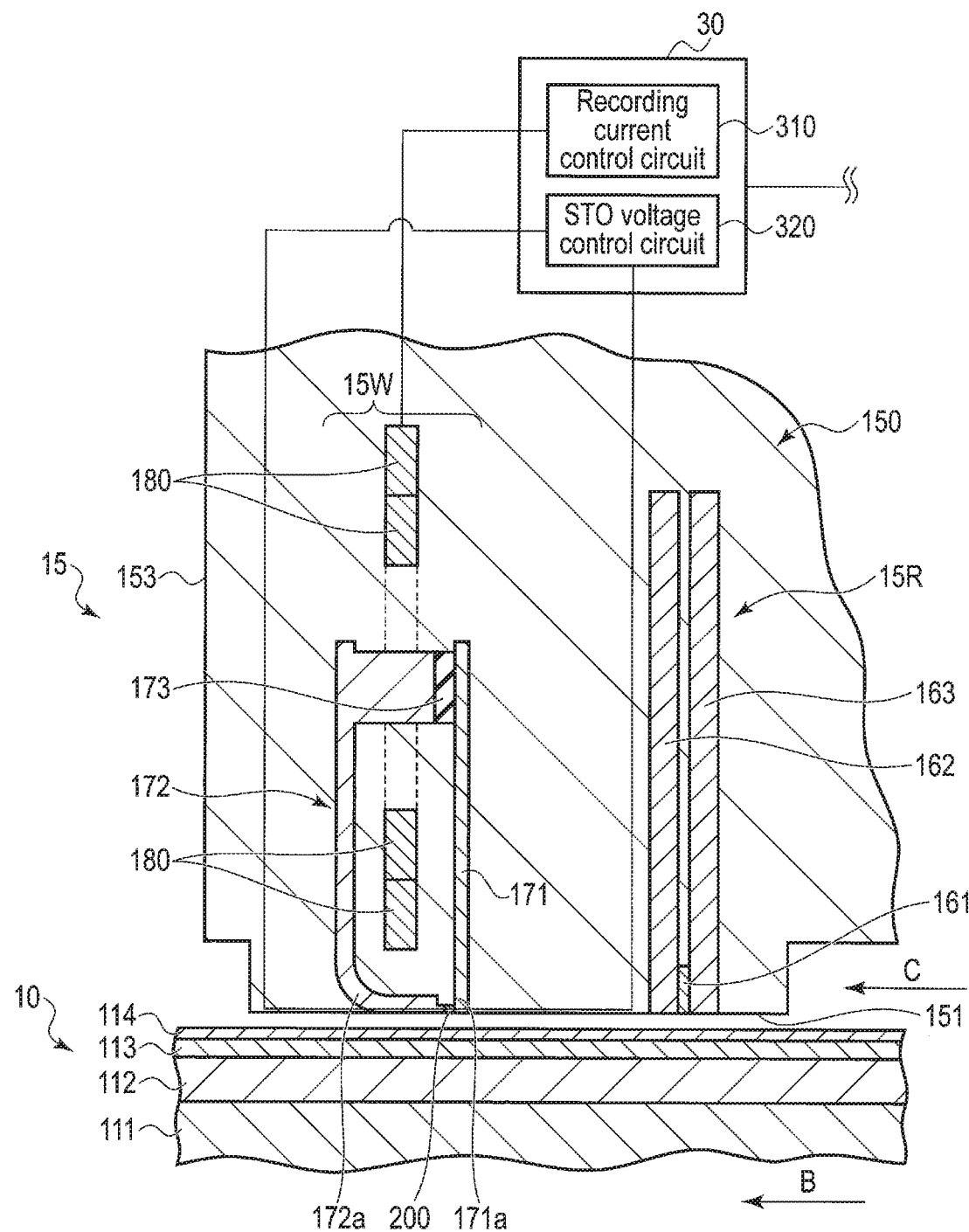
FIG. 3 is an enlarged cross-sectional view illustrating an example of a disk and a head according to the present embodiment.

In general, according to one embodiment, a magnetic disk device comprises: a disk; a head comprising a main magnetic pole having a first end and a second end opposite to the first end in a radial direction of the disk, a write shield facing the main magnetic pole with a gap, and an assist element provided in the gap and at a position where a first distance between the first end and the assist element and a second distance between the second end and the assist element are different from each other; and a controller which controls a voltage applied to the assist element according to a shingled write direction in which a second track is overwritten on a first track.

According to another embodiment, a magnetic disk device comprises: a disk; and a head comprising a main magnetic pole, a write shield facing the main magnetic pole at an gap, and an assist element provided at the gap between the main magnetic pole and the write shield; wherein the head overwrites, when a first recording density of a first area in which a second track is overwritten in a first direction of a first track, which is a radial direction of the disk, is lower than a second recording density of the first area in which the second track is overwritten in a second direction opposite to the first direction of the first track, the second track in the second direction of the first track in the first area.

According to another embodiment, a disk; a head comprising a main magnetic pole, a write shield facing the main magnetic pole with a gap, and an assist element provided to be shifted from a center of the main magnetic pole; and a controller which controls a voltage to be applied to the assist eminent according to a positioning location of the head.

Hereinafter, embodiments will be described with reference to the drawings. The drawings are merely examples and do not limit the scope of the invention.

Embodiment

FIG. 1 is a block diagram illustrating a structure of a magnetic disk device 1 according to an embodiment.

The magnetic disk device 1 includes a head disk assembly (HDA) described later, a driver IC 20, a head amplifier integrated circuit (hereinafter, a head amplifier IC or a preamplifier) 30, a volatile memory 70, a nonvolatile memory 80, a buffer memory (buffer) 90, and a system controller 130 that is an integrated circuit of one chip. The magnetic disk device 1 is connected to a host system (hereinafter simply referred to as a host) 100.

The HDA includes a magnetic disk (hereinafter referred to as a disk) 10, a spindle motor (hereinafter referred to as an SPM) 12, an arm 13 on which a head 15 is mounted, and a voice coil motor (hereinafter referred to as a VCM) 14. The disk 10 is attached to the SPM 12 and is rotated by the driving of the SPM 12. The arm 13 and the VCM 14 constitute an actuator. The actuator controls the movement of the head 15 mounted on the arm 13 to a particular position of the disk 10 by the driving of the VCM 14. The disk 10 and the head 15 may be provided with two or more disks and two or more heads, respectively.

FIG. 2 is a schematic view illustrating an example of the arrangement of the head 15 with respect to the disk 10 according to the present embodiment, and FIG. 3 is an enlarged cross-sectional view illustrating an example of the disk 10 and the head 15 according to the present embodiment. Hereinafter, a direction orthogonal to a radial direction of the disk 10 will be referred to as a circumferential direction. As illustrated in FIG. 2, a direction toward an outer circumference of the disk 10 in the radial direction is referred to as an outward direction (outside), and a direction opposite to the outward direction is referred to as an inward direction (inside). In addition, as illustrated in FIG. 2, in the circumferential direction, a direction in which the disk 10 rotates is referred to as a rotational direction. Note that in the example illustrated in FIG. 2, the rotational direction is illustrated clockwise, but may be a reverse direction (counterclockwise). In FIG. 3, the rotational direction B of the disk 10 and the direction of air flow C coincide with each other. Hereinafter, a direction from the head 15 to the disk 10 is referred to as a downward direction, and a direction from the disk 10 to the head 15 is referred to as an upward direction.

In the disk 10, a shingled magnetic recording (SMR) area 10s and a media cache area 10m are allocated to a data region. In the shingled magnetic recording area 10s, user data and the like requested to be written from the host 100 are recorded. The media cache area 10m can be used as a cache of the shingled magnetic recording area 10s. In the shingled magnetic recording area 10s, a track to be written next is overwritten to a part of the track. Therefore, the track density (track per inch: TPI) of the shingled magnetic recording area 10s is higher than the track density of the recording area that has not been overwritten, for example, the recording area that has been written in the conventional magnetic recording (CMR) type. In the shingled magnetic recording area 10s, a plurality of track groups each including a plurality of tracks continuously overwritten in one direction in the radial direction are disposed at intervals (gaps). Hereinafter, the recording area in which the track group (band) continuously overwritten in one direction in the radial direction is written is referred to as a band area. The band area includes at least one track on which the radially adjacent track (hereinafter referred to as an adjacent track) is partially overwritten, and a last overwritten track (final track). The final track has a wider track width than that of the partially overwritten track because another track is not partially overwritten. In the band area, the written track is referred to as a write track, and the portion of the remaining write track excluding the area where the adjacent track is overwritten is referred to as a read track. In addition, the write track may be simply referred to as a track, the read track may be simply referred to as a track, and the write track and the read track may be collectively referred to as a track. The track includes a plurality of sectors. The "track" is used as one of a plurality of areas divided in the radial direction of the disk 10, data extending in the circumferential direction of the disk 10, data written to the track, or other various meanings. The "sector" is used as one of a plurality of areas obtained by dividing the track in the circumferential direction, data written to a particular position of the disk 10, data written to the sector, and various other meanings. In addition, a radial width of the write track may be referred to as a write track width, and a radial width of the read track may be referred to as a read track width. The write track width and the read track width may be collectively referred to as a track width. Further, a central position of the track width is referred to as a track center.

The head 15 includes a slider as a main body, and a write head 15W and a read head 15R that are mounted on the slider. The write head 15W writes data to the disk 10. The read head 15R reads data recorded in the track of the disk 10. The write head 15W may be simply referred to as the head 15, the read head 15R may be simply referred to as the head 15, and the write head 15W and the read head 15R may be collectively referred to as the head 15. The central portion of the head 15 may be referred to as the head 15, the central portion of the write head 15W may be referred to as the write head 15W, and the central portion of the read head 15R may be referred to as the read head 15R.

In the example illustrated in FIG. 2, the shingled magnetic recording area 10s is divided, in the radial direction, into an inner circumferential region IR positioned inward, an outer circumferential region OR positioned outward, and a middle circumferential region MR positioned between the inner circumferential region IR and the outer circumferential region OR. Further, in FIG. 2, the shingled magnetic recording area 10s is divided into recording areas having a particular width in the radial direction (hereinafter referred to as radial areas), for example, band areas, zones, or the like. FIG. 2 illustrates zones ZNO, ZNM, and ZNI among several radial areas of the shingled magnetic recording area 10s. The zone ZNO is positioned in the outer circumferential region OR, the zone ZNM is positioned in the middle circumferential region MR, and the zone ZNI is positioned in the inner circumferential region IR. FIG. 2 illustrates a radial position IRP, a radial position MRP, and a radial position ORP. The radial position IRP is a position inward of the radial position MRP, and the radial position ORP is a position outward of the radial position MRP. In the example illustrated in FIG. 2, the radial position MRP is included in the zone ZNM of the middle circumferential region MR, the radial position ORP is included in the zone ZNO of the outer circumferential region OR, and the radial position IRP is included in the zone ZNI of the inner circumferential region IR. In FIG. 2, the radial position IRP corresponds to a track center IIL of a particular track of the zone ZNI, the radial position RP0 corresponds to a track center MIL of a particular track of the zone ZNM, and the radial position ORP corresponds to a track center OIL of a particular track of the zone ZNO. The track center IIL corresponds to a locus or path of the head 15 in a particular track, for example, a particular track of the zone ZNI (hereinafter also referred to as a target track or a target path). The track center MIL corresponds to a target path of the head 15 in a particular track, for example, a particular track of the zone ZNM. The track center OIL corresponds to a target track of the head 15 in a particular track, for example, a particular track of the zone ZNO. The track centers IIL, MIL, and OIL are positioned concentrically with respect to the disk 10. For example, the track centers IIL, MIL, and OIL are positioned in a perfect circle. The track centers IIL, MIL, and OIL do not have to be circular, and may be positioned in a wave shape that changes in the radial direction of the disk 10.

The disk 10 has a plurality of servo patterns SV. Hereinafter, the servo patterns SV may be referred to as servo sectors or servo regions. The plurality of servo patterns SV radially extend in the radial direction of the disk 10 and are discretely disposed at particular intervals in the circumferential direction. The servo pattern SV includes servo data and the like for positioning the head 15 at a particular radial position of the disk 10. In the shingled magnetic recording area 10s, user data can be written to the shingled magnetic recording area 10s other than the servo sector SV.

In the example illustrated in FIG. 3, a substrate 111, a soft magnetic layer 112, a magnetic recording layer 113, and a protective film layer 114 are sequentially stacked in the disk 10. The substrate 111 is formed of a disk-shaped nonmagnetic material. The soft magnetic layer 112 is formed of a material exhibiting soft magnetic characteristics above the substrate 111. The magnetic recording layer 113 is formed above the soft magnetic layer 112 and has magnetic anisotropy in the direction perpendicular to the surface of the disk 10 (the surface of the magnetic recording layer 113 or the surface of the protective film layer 114). The protective film layer 114 is formed above the magnetic recording layer 113.

In the illustrated example, the head 15 includes a slider 150. The slider 150 is formed of, for example, a sintered body (altic) of titanium carbide and alumina. The slider 150 has a disk facing surface (air bearing surface (ABS)) 151 facing the surface of the disk 10 and a trailing end 153 positioned on the outflow side of the air flow C. A part of the read head 15R and the write head 15W is exposed to the disk facing surface 151.

The read head 15R includes a magnetic film 161, a shield film 162, and a shield film 163. The magnetic film 161 is positioned between the shield film 162 and the shield film 163 and produces a magnetoresistance effect. The shield film 162 is positioned on the trailing end 153 side with respect to the magnetic film 161. The shield film 163 faces the shield film 162. The lower ends of the magnetic film 161, the shield film 162, and the shield film 163 are exposed to the disk facing surface 151.

The write head 15W is provided on the trailing end 153 side of the slider 150 with respect to the read head 15R. The write head 15W includes a main magnetic pole 171, a trailing shield (write shield) 172, an insulator 173, a recording coil 180 disposed to be wound around a magnetic circuit including the main magnetic pole 171 and the write shield 172 so as to allow a magnetic flux to flow to the main magnetic pole 171, and a magnetic flux control unit (assist element), for example, a spin torque oscillator (STO) 200.

The main magnetic pole 171 is made of a soft magnetic material having a high saturation magnetic flux density. The main magnetic pole 171 generates a recording magnetic field in a direction perpendicular to the surface of the disk 10 so as to magnetize the magnetic recording layer 113 of the disk 10. In the illustrated example, the main magnetic pole 171 extends substantially perpendicularly to the disk facing surface 151. The lower surface of the tip end portion 171a of the main magnetic pole 171 on the disk facing surface 151 side is exposed to the disk facing surface 151. The tip end portion 171a of the main magnetic pole 171 is tapered toward the disk facing surface 151 and is formed in a columnar shape having a narrow width with respect to the other portions. The width of the tip end portion 171a of the main magnetic pole 171 in the cross-track direction substantially corresponds to the track width of the write track. The cross-track direction is, for example, a direction along the radial direction.

The write shield 172 is made of a soft magnetic material having a high saturation magnetic flux density. The write shield 172 is provided to efficiently close the magnetic path via the soft magnetic layer 112 directly below the main magnetic pole 171. The write shield 172 is positioned on the trailing end 153 side with respect to the main magnetic pole 171. The write shield 172 is coupled to the main magnetic pole 171 via the insulator 173. The main magnetic pole 171 and the write shield 172 are electrically isolated from each other and form a magnetic circuit. The write shield 172 is formed in a substantially L-shape and has a tip end portion 172a facing the disk facing surface 151 with the tip end portion 171a of the main magnetic pole 171 with a write gap. The lower surface of the tip end portion 172a is exposed to the disk facing surface 151 of the slider 150.

The recording coil 180 is provided to be wound around the magnetic circuit including the main magnetic pole 171 and the write shield 172 so as to allow the magnetic flux to flow to the main magnetic pole 171. The recording coil 180 is provided, for example, between the main magnetic pole 171 and the write shield 172. By supplying a current of a particular magnitude (referred to as a write current or a recording current) to the recording coil 180, a recording magnetic field is excited in the main magnetic pole 171 and the write shield 172. Therefore, the main magnetic pole 171 and the write shield are magnetized. A magnetization pattern corresponding to the recording current is recorded on the disk 10 by changing the magnetization direction of the recording bit of the magnetic recording layer 113 of the disk 10 by the magnetic flux flowing through the magnetized main magnetic pole 171 and the magnetized write shield 172.

The spin torque oscillator 200 is provided between the tip end portion 171a of the main magnetic pole 171 and the tip end portion 172a of the write shield 172. In other words, the spin torque oscillator 200 is provided in the write gap. The spin torque oscillator 200 has, for example, a structure in which an underlayer including a nonmagnetic conductive layer, a spin injection layer, an intermediate layer, an oscillation layer, and a gap layer including a nonmagnetic conductive layer are stacked from the tip end portion 171a side of the main magnetic pole 171 to the tip end portion 172a side of the write shield 172. By applying a particular voltage (drive voltage) or a particular current (drive current), the spin torque oscillator 200 uniformly rotates the magnetization by the gap magnetic field generated in the write gap (spin precession) and generates a high frequency magnetic field (microwave) having a sufficiently high frequency toward the disk 10 as compared with the frequency of the recording signal. The spin torque oscillator 200 reduces the coercive force of the magnetic recording layer 113 by applying the high frequency magnetic field to the magnetic recording layer 113 of the disk 10. When the spin precession is largely generated in the spin torque oscillator 200, the permeability of the spin torque oscillator 200 is in a state as low as the permeability of air. Therefore, the magnetic flux from the main magnetic pole 171 is more likely to flow toward the disk 10 than the write gap (spin torque oscillator 200). In contrast, when the spin precession of the spin torque oscillator 200 is not generated or is smaller than normal, the permeability of the spin torque oscillator 200 becomes higher than the permeability of air. Therefore, the magnetic flux from the main magnetic pole 171 is more likely to flow toward the write gap (spin torque oscillator 200) than the disk 10. Hereinafter, the write process of writing data by applying the drive voltage or the drive current to the spin torque oscillator 200 may be referred to as assist recording or high frequency assist recording. Hereinafter, the voltage or the current applied to the spin torque oscillator 200 may be referred to as an assist voltage or an assist current. In addition, the effect of assisting the write process to the disk 10 may be referred to as an assist effect.

The driver IC 20 controls the driving of the SPM 12 and the VCM 14 according to the control of the system controller 130 (specifically, an MPU 60 described later).

The head amplifier IC (preamplifier) 30 includes a read amplifier and a write driver (not illustrated), for example, a recording current control circuit 310 and an STO voltage control circuit 320. The read amplifier amplifies a read signal read from the disk 10 and outputs the amplified read signal to the system controller 130 (more specifically, a read/write (R/W) channel 50 described later). The recording current control circuit 310 is electrically connected to the recording coil 180 and supplies the recording current to the recording coil 180 according to the write data output from the R/W channel 50. For example, the recording current control circuit 310 supplies the recording current to the recording coil 180 according to the control of the system controller 130 (MPU 60). The STO voltage control circuit 320 is electrically connected to the spin torque oscillator 200 and applies the particular assist voltage or assist current to the spin torque oscillator 200 according to the control of the system controller 130, for example, the MPU 60.

The volatile memory 70 is a semiconductor memory in which stored data is lost when power supply is cut off. The volatile memory 70 stores data and the like necessary for processing in each unit of the magnetic disk device 1. The volatile memory 70 is, for example, a dynamic random access memory (DRAM) or a synchronous dynamic random access memory (SDRAM).

The nonvolatile memory 80 is a semiconductor memory that records stored data even when power supply is cut off. The nonvolatile memory 80 is, for example, a NOR type or NAND type flash ROM (flash read only memory: FROM).

The buffer memory 90 is a semiconductor memory that temporarily records data and the like transmitted and received between the magnetic disk device 1 and the host 100. Note that the buffer memory 90 may be integrated with the volatile memory 70. The buffer memory 90 is, for example, a DRAM, a static random access memory (SRAM), an SDRAM, a ferroelectric random access memory (FeRAM), or a magnetoresistive random access memory (MRAM).

The system controller (controller) 130 is realized by, for example, using a large scale integrated circuit (LSI) called a system-on-a-chip (SoC) in which a plurality of elements are integrated on a single chip. The system controller 130 includes a hard disk controller (HDC) 40, a read/write (R/W) channel 50, and a microprocessor (MPU) 60. The HDC 40, the R/W channel 50, and the MPU 60 are electrically connected to one another. The system controller 130 is electrically connected to, for example, the driver IC 20, the head amplifier IC 60, the volatile memory 70, the nonvolatile memory 80, the buffer memory 90, the host system 100, and the like.

The HDC 40 controls data transmission between the host 100 and the R/W channel 50 according to an instruction from the MPU 60 described later. The HDC 40 is electrically connected to, for example, the volatile memory 70, the nonvolatile memory 80, and the buffer memory 90.

The R/W channel 50 performs signal processing of read data and write data according to an instruction from the MPU 60. The R/W channel 50 is electrically connected to, for example, the head amplifier IC 30 and the like. The R/W channel 50 has a circuit or a function that modulates the write data. In addition, the R/W channel 50 has a circuit or a function that measures the signal quality of the read data.

The MPU 60 is a main controller that controls each unit of the magnetic disk device 1. The MPU 60 controls the VCM 14 via the driver IC 20 so as to perform positioning of the head 15. The MPU 60 controls the operation of writing data to the disk 10 and selects the storage destination of the write data transmitted from the host 100. In addition, the MPU 60 also controls the operation of reading data from the disk 10 and controls the processing of read data transmitted from the disk 10 to the host 100. The MPU 60 is connected to each unit of the magnetic disk device 1. The MPU 60 is electrically connected to, for example, the driver IC 20, the HDC 40, the R/W channel 50, and the like.

The MPU 60 includes a read/write controller 610 and a current/voltage controller 620. The MPU 60 performs the processing of each unit, for example, the read/write controller 610, the current/voltage controller 620, and the like on firmware. Note that the MPU 60 may include each unit, for example, the read/write controller 610, the current/voltage controller 620, and the like as a circuit.

The read/write controller 610 controls data read processing and data write processing according to a command from the host 100. The read/write controller 610 controls the VCM 14 via the driver IC 20, positions the head 15 at a particular radial position on the disk 10, and performs read processing or write processing. For example, the read/write controller 610 sequentially overwrites data in a particular band area of the disk 10 by assist recording. (Shingled magnetic recording).

The read/write controller 610 writes data to a particular radius area by assist recording of applying an assist voltage (or assist current) higher than the drive voltage (or drive current) to the spin torque oscillator 200, based on recording density, for example, linear recording density (bit per inch: BPI) of the radius area, for example, a band area or a zone shingled-recorded in a shingled write direction in the radial direction (hereinafter referred to as a shingled recording direction or a write direction). Hereinafter, for convenience of explanation, "performing shingled magnetic recording on data by assist recording of applying an assist voltage (or assist current) equal to or higher than a drive voltage (or a drive current) to the spin torque oscillator 200" is referred to as "assist/shingled magnetic recording", and "recording density of a particular radius area recorded in the assist/shingled magnetic recording" may be referred to as "assist/shingled magnetic recording density". The read/write controller 610 changes the shingled write direction according to a location where the head 15 is positioned (which may be referred to as a positioning location hereinafter), that is, a radius area where the head 15 is positioned. For example, the read/write controller 610 determines whether the assist/shingled magnetic recording density in the particular radius area is the same or different depending on the shingled magnetic recording direction, based on the information indicating the relationship between the shingled magnetic recording direction and the assist/shingled magnetic recording density measured for each radial area obtained by dividing the shingled magnetic recording area 10s into several parts in the radial direction. When it is determined that the assist/shingled magnetic recording density is the same depending on the shingled magnetic recording direction, the read/write controller 610 assists/shingled-magnetic-records data with any one of the inward and outward directions as the shingled magnetic recording direction in a particular radius area. In other words, when it is determined that the assist/shingled magnetic recording density does not change the same depending on the shingled magnetic recording direction, the read/write controller 610 assists/shingled-magnetic-records data with any one of the inward and outward directions as the shingled magnetic recording direction in a particular radius area. When it is determined that the assist/shingled magnetic recording density differs depending on the shingled magnetic recording direction, the read/write controller 610 assists/shingled-magnetic-records data by using, as the shingled magnetic recording direction, the direction (hereinafter referred to as the high density direction) corresponding to the higher assist/shingled magnetic recording density of the assist/shingled magnetic recording density assisted/shingled-magnetic-recorded in the inward direction and the assist/shingled magnetic recording density assisted/shingled-magnetic-recorded in the outward direction in the particular radius area. In other words, when it is determined that the assist/shingled magnetic recording density changes depending on the shingled magnetic recording direction, the read/write controller 610 assists/shingled-magnetic-records data by using, as the shingled magnetic recording direction, the high density direction in the particular radius area. When it is determined that the assist/shingled magnetic recording density differs depending on the shingled magnetic recording direction, the read/write controller 610 may assists/shingled-magnetic-record data by using, as the shingled magnetic recording direction, the direction (hereinafter referred to as the low density direction) corresponding to the lower assist/shingled magnetic recording density of the assist/shingled magnetic recording density assisted/shingled-magnetic-recorded in the inward direction and the assist/shingled magnetic recording density assisted/shingled-magnetic-recorded in the outward direction in the particular radius area. In other words, when it is determined that the assist/shingled magnetic recording density changes depending on the shingled magnetic recording direction, the read/write controller 610 may assists/shingled-magnetic-record data by using, as the shingled magnetic recording direction, the low density direction in the particular radius area.

FIG. 4A is a schematic view illustrating an example of a band area BA1 including a track group written with the outer direction as the shingled magnetic recording direction. In FIG. 4A, the shingled magnetic recording direction corresponds to the outward direction.

FIG. 4A illustrates the write tracks Wt1, Wt2, and Wt3 written to the band area BA1 of the shingled magnetic recording area 10s. FIG. 4A illustrates the remaining read track Rt1 in which the write track Wt1 is not overwritten, the remaining read track Rt2 in which the write track Wt2 is not overwritten, and the read track Rt3. In FIG. 4A, for convenience of explanation, each track is indicated by a straight line extending along the circumferential direction with a certain track width, but in actuality, each track may be a curve along the circumferential direction, relative to the circumferential direction and may vary in the radial direction. In FIG. 4A, although three tracks are written in the band area BA1, less than three or more than three tracks may be written.

In the example illustrated in FIG. 4A, the read/write controller 610 determines in the band area BA1 that the assist/shingled magnetic recording density assisted/shingled-magnetic-recorded in the outward direction is higher than the assist/shingled magnetic recording density assisted/shingled-magnetic-recorded in the inward direction, writes the write track Wt1 to the band area BA1 with the outward direction as the shingled magnetic recording direction, overwrites the write track Wt2 on a part of the write track Wt1 in the outward direction, and overwrites the write track Wt3 on a part of the write track Wt2 in the outward direction. Note that the read/write controller 610 may assist/shingled-magnetic-record a plurality of write tracks with the inward direction as the shingled magnetic recording direction in the band area BA1.

Figure 4B:
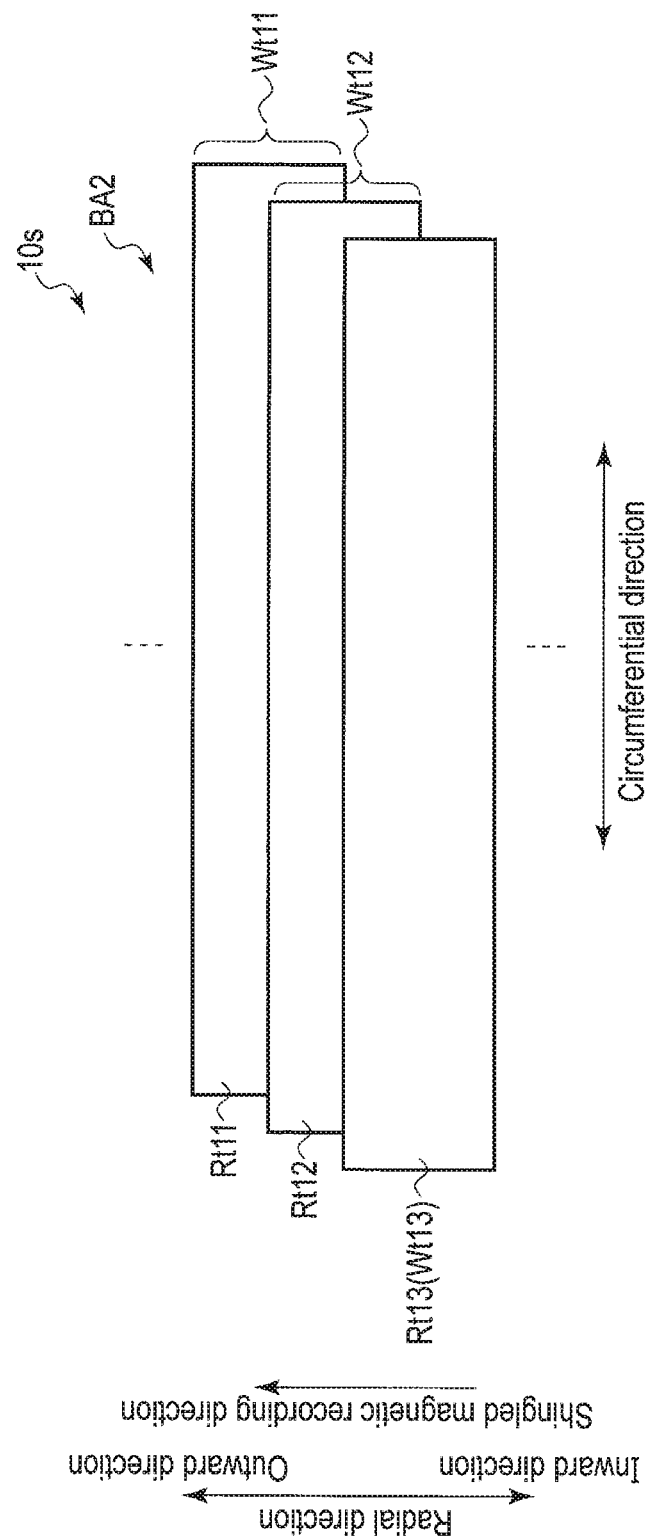
FIG. 4B is a schematic view illustrating an example of a band area including a track group written with an inward direction as a shingled recording direction.

FIG. 4B is a schematic view illustrating an example of a band area BA2 including a track group written with the inward direction as the shingled magnetic recording direction. In FIG. 4A, the shingled magnetic recording direction corresponds to the outward direction.

FIG. 4B illustrates write tracks Wt11, Wt12, and Wt13 written to the band area BA2 of the shingled magnetic recording area 10s. FIG. 4B illustrates the remaining read track Rt11 in which the write track Wt11 is not overwritten, a remaining read track Rt12 in which the write track Wt12 is not overwritten, and a read track Rt13. In FIG. 4B, for convenience of explanation, each track is indicated by a straight line extending along the circumferential direction with a certain track width, but in actuality, each track may be a curve along the circumferential direction, and may be radially displaced with respect to the circumferential direction. In FIG. 4B, in the band area BA2, three tracks are written, but less than three or more than three tracks may be written.

In the example illustrated in FIG. 4B, the read/write controller 610 determines that the assist/shingled magnetic recording density assisted/shingled-magnetic-recorded in the inward direction is higher than the assist/shingled magnetic recording density assisted/shingled-magnetic-recorded in the outward direction in the band area BA2, writes the write track Wt11 to the band area BA2 with the inward direction as the shingled magnetic recording direction, overwrites the write track Wt12 on a part of the write track Wt11 in the inward direction, and overwrites the write track Wt13 on a part of the write track Wt12 in the inward direction. Note that the read/write controller 610 may set the outward direction as the shingled magnetic recording direction and the plurality of write tracks as the assist/shingled magnetic recording density in the band area BA2.

As described above, as a factor that assist/shingled magnetic recording density in the particular recording area differs depending on the shingled magnetic recording direction, variations in magnetic field strength and magnetic field gradient at both end portions in the radial direction of the head 15 due to mounting intersections of the sliders 150, displacement of the spin torque oscillator 200, and the like can be considered.

Figure 5:
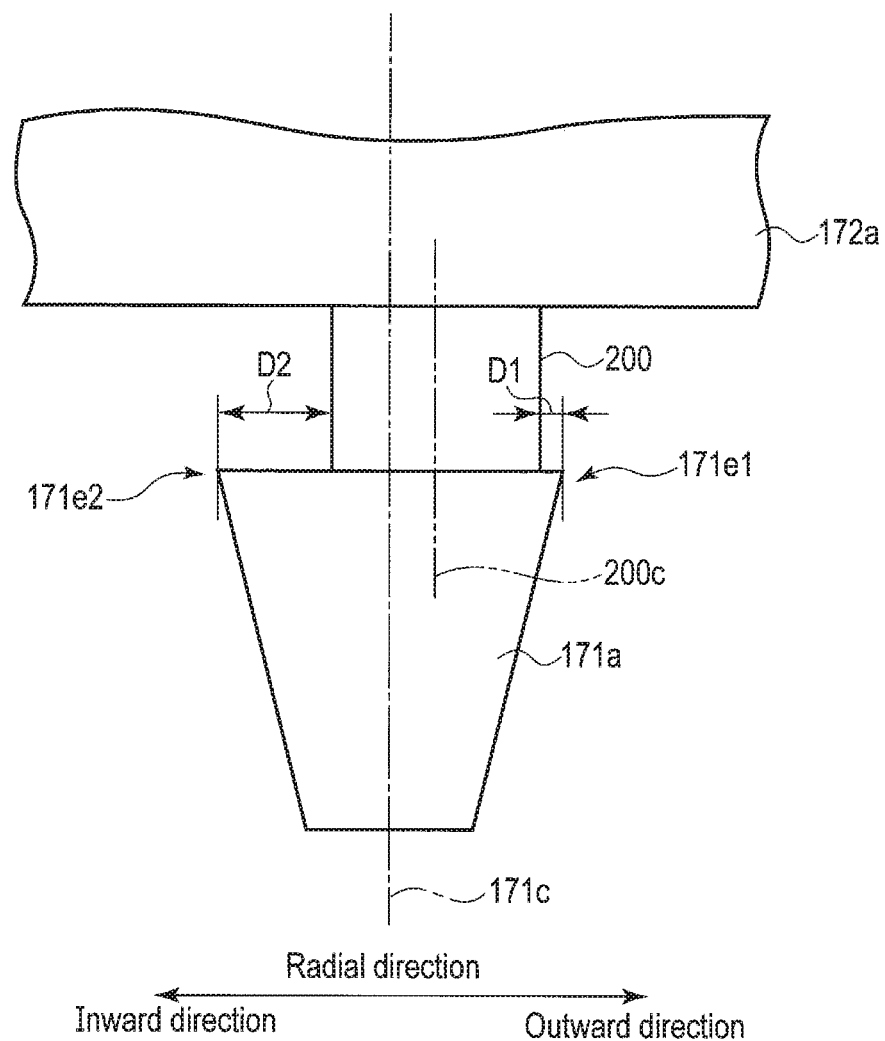
FIG. 5 is a schematic view illustrating an example of factors that cause different assist/shingled recording densities in a particular recording area depending on a shingled recording direction.

FIG. 5 is a schematic view illustrating an example of the factor that the assist/shingled magnetic recording density in the particular recording area differs depending on the shingled magnetic recording direction. FIG. 5 schematically illustrates one structural example of the lower surface of the head 15 observed from the disk facing surface 151 side. In FIG. 5, for example, the head 15 is positioned at a particular track of a particular zone ZNM of the middle circumferential region MR.

In FIG. 5, the radial center 200c of the spin torque oscillator 200 is shifted outward with respect to the radial center 171c of the tip end portion 171a of the main magnetic pole 171. The spin torque oscillator 200 is positioned on the outward end portion 171e1 side of the tip end portion 171a of the main magnetic pole 171. In other words, a distance D1 between the spin torque oscillator 200 and the end portion 171e1 is different from a distance D2 between the spin torque oscillator 200 and the end portion 171e2 opposite to the first end portion 171e1. Each of the end portion 171e1 and 171e2 corresponds to the side intersecting with the surface facing the tip end portion 172a in the tip end portion 171a. In the example illustrated in FIG. 5, the distance D1 is smaller than the distance D2. Therefore, when the head 15 is positioned on a particular track, for example, a particular radial position of the middle circumferential region MR and the particular track is written, the recording density of the shingled magnetic recording in the inward direction with respect to the track center may be higher than the recording density of the shingled magnetic recording in the outward direction with respect to the track center in this track. For example, the read/write controller 610 assists/shingled-magnetic-records data in a particular shingled magnetic recording direction in a particular radius area based on the distances D1 and D2. In the example illustrated in FIG. 5, the read/write controller 610 determines that, since the distance D2 is larger than the distance D1, the assist/shingled magnetic recording density assisted/shingled-magnetic-recorded in the inward direction is higher than the assist/shingled magnetic recording density assisted/shingled-magnetic-recorded in the outward direction in a particular radius area, for example, in a particular zone ZNM of the middle circumferential region MR, and assists/shingled-magnetic-records data with the inward direction as the shingled magnetic recording direction. Note that the read/write controller 610 may perform assist/shingled-magnetic-record data with the inward direction as the shingled magnetic recording direction in a particular radius area, for example, a particular zone ZNM of the middle circumferential region MR. In addition, the read/write controller 610 may perform assist/shingled-magnetic-record data in a particular shingled magnetic recording direction in a particular radius area based on the difference between the distance D1 and the distance D2.

The radial center 200c of the spin torque oscillator 200 may be shifted inward with respect to the radial center 171c of the tip end portion 171a of the main magnetic pole 171. The spin torque oscillator 200 may be positioned on the inward end portion 171e2 side of the tip end portion 171a of the main magnetic pole 171. For example, the distance D1 is larger than the distance D2. When the head 15 is positioned on a particular track, for example, a particular radial position of the middle circumferential region MR and the particular track is written, the recording density of the area in the outward direction with respect to the track center may be higher than the recording density of the area in the inward direction with respect to the track center in this particular track. When the spin torque oscillator 200 is positioned on the inward end portion 171e2 side of the tip end portion 171a of the main magnetic pole 171, the read/write controller 610 determines that, since the distance D1 can be larger than the distance D2, the assist/shingled magnetic recording density in the outward direction is higher than the assist/shingled magnetic recording density in the inward direction in a particular radius area, for example, in a particular zone ZNM of the middle circumferential region MR, and assists/shingled-magnetic-records data with the outward direction as the shingled magnetic recording direction. Note that the read/write controller 610 may perform assist/shingled-magnetic-record data with the outer direction as the shingled magnetic recording direction in a particular radius area, for example, a particular zone ZNM of the middle circumferential region MR.

The current/voltage controller 620 controls (adjusts) the current or the voltage, for example, the recording current or the assist voltage (or assist current). The current/voltage controller 620 controls the recording current or the assist voltage (or assist current) according to a positioning location of the head 15, for example, a radius area where the head 15 is positioned. For example, when the assist/shingled magnetic recording is performed in a particular shingled magnetic recording direction in a particular radius area, the current/voltage controller 620 applies, to the spin torque oscillator 200, the assist voltage (hereinafter sometimes referred to as the saturation assist voltage) or the assist current (hereinafter sometimes referred to as the saturation assist current) that saturates assist/shingled magnetic recording density in a particular radius area within a particular voltage (or current) range (hereinafter referred to as a voltage (current) range) by performing assist/shingled magnetic recording in a particular shingled magnetic recording direction. For example, when the assist/shingled magnetic recording is performed in a particular shingled magnetic recording direction in a particular radius area, the current/ voltage controller 620 applies the saturation assist voltage or the saturation assist current within the voltage range to the spin torque oscillator 200 based on the information indicating the relationship between the assist voltage or the assist current and the assist/shingled magnetic recording density, which is measured for each radius area obtained by dividing the shingled magnetic recording area 10s into several sections in the radial direction. In a case where there are multiple saturation assist voltages in the voltage range when the assist/shingled magnetic recording is performed in a particular shingled magnetic recording direction in a particular radius area, the current/voltage controller 620 applies, to the spin torque oscillator 200, the saturation assist voltage with the voltage which is lowest of the plurality of saturation assist voltages. In a case where there is no saturation assist voltage in the plurality of assist voltages in the voltage range when the assist/shingled magnetic recording is performed in a particular shingled magnetic recording direction in a particular radius area, the current/voltage controller 620 applies, to the spin torque oscillator 200, the assist voltage that maximizes the assist/shingled magnetic recording density, for example, the assist voltage within the voltage range (hereinafter sometimes referred to as the maximum assist voltage), which is highest of the plurality of assist voltages. In other words, in a case where the plurality of assist voltages in the voltage range is lower than the saturation assist voltage when the assist/shingled magnetic recording is performed in a particular shingled magnetic recording direction in a particular radius area, the current/ voltage controller 620 applies, to the spin torque oscillator 200, the assist voltage that maximizes the assist/shingled magnetic recording density, for example, the maximum assist voltage. The current/voltage controller 620 may adjust the recording current applied to the recording coil 180 when the assist voltage (or assist current) is adjusted (controlled) according to the radius area or the shingled magnetic recording direction. Note that when data is assisted/shingled-magnetic-recorded in a low density direction in a particular radius area, the current/voltage controller 620 may apply, to the spin torque oscillator 200, the assist voltage higher than the assist voltage when data is assisted/shingled-magnetic-recorded in a high density direction in a particular radius area. In addition, the current/voltage controller 620 may apply different assist voltages (or assist currents) to the spin torque oscillator 200 in the particular radius area according to the shingled magnetic recording direction.

FIG. 6 is a view illustrating an example of a change in the assist/shingled magnetic recording density with respect to the assist voltage for each particular radius area. In FIG. 6, the horizontal axis indicates the assist voltage (dac), and the vertical axis indicates the assist/shingled magnetic recording density (bpsi: bit per square inch). On the vertical axis of FIG. 6, the assist/shingled magnetic recording density increases in a direction of a large arrow and decreases in a direction of a small arrow. On the horizontal axis of FIG. 6, the assist voltage increases in the direction of the large arrow and decreases in the direction of the small arrow. The horizontal axis of FIG. 6 is divided into an area OZR corresponding to a zone ZNO of an outer circumferential region OR, an area MZR corresponding to a zone ZNM of a middle circumferential region MR, and an area IZR corresponding to an inner circumferential region IR. On the horizontal axis of FIG. 6, assist voltages VL1, VL2, and VL3 are illustrated in the areas OZR, MZR, and IZR, respectively. The assist voltage VL2 is higher than the assist voltage VL1, and the assist voltage VL3 is higher than the assist voltage VL2. In the areas OZR, ZNM, and ZNI in which the horizontal axis of FIG. 6 is divided, the voltage range corresponds to the range from the assist voltage VL1 to the assist voltage VL3. That is, in FIG. 6, the assist voltage VL3 corresponds to the maximum assist voltage.

In the area OZR, a change OOI in the assist/shingled magnetic recording density with respect to the assist voltage in the case of assist/shingled magnetic recording in the inward direction in the zone ZNO and a change OIO in the assist/shingled magnetic recording density with respect to the assist voltage in the case of assist/shingled magnetic recording in the outward direction in the zone ZNO are shown. The change OOI in the assist/shingled magnetic recording density is greater than the change OIO in the assist/shingled magnetic recording density. That is, in the zone ZNO, the assist/shingled magnetic recording density assisted/shingled-magnetic-recorded in the inward direction is larger than the assist/shingled magnetic recording density assisted/shingled-magnetic-recorded in the outward direction. In the area OZR, the assist/shingled magnetic recording density BP11 with respect to the assist voltage VL2 and the assist/shingled magnetic recording density BP12 with respect to the assist voltage VL3 are shown. The assist/shingled magnetic recording densities BP11 and BP12 are the same. In other words, even when the assist/shingled magnetic recording density is saturated at the assist voltage (saturation assist voltage) VL2 and the assist voltage (saturation assist voltage) VL3 higher than VL2 is applied, the assist/shingled magnetic recording density does not change at BP11 and BP12. In the area MZR, a change MOI in the assist/shingled magnetic recording density with respect to the assist voltage in the case of assist/shingled magnetic recording in the inward direction in the zone ZNM and a change MIO in the assist/shingled magnetic recording density with respect to the assist voltage in case of assist/shingled magnetic recording in the outward direction in the zone ZNM. The change MOI in the assist/shingled magnetic recording density is larger than the change MIO in the assist/shingled magnetic recording density. That is, in the zone ZNM, the assist/shingled magnetic recording density assisted/shingled-magnetic-recorded in the inward direction is larger than the assist/shingled magnetic recording density assisted/shingled-magnetic-recorded in the outward direction. In the area MZR, the assist/shingled magnetic recording density BP21 with respect to the assist voltage VL2 and the assist/shingled magnetic recording density BP22 with respect to the assist voltage VL3 are shown. The assist/shingled magnetic recording densities BP21 and BP22 are the same. In other words, even when the assist/shingled magnetic recording density is saturated at the assist voltage (saturation assist voltage) VL2 and the assist voltage (saturation assist voltage) VL3 higher than VL2 is applied, the assist/shingled magnetic recording density does not change at BP21 and BP22. In the area OZI, a change IOI in the assist/shingled magnetic recording density with respect to the assist voltage in the case of assist/shingled magnetic recording in the inward direction in the zone ZNI and a change IIO in the assist/shingled magnetic recording density with respect to the assist voltage in case of assist/shingled magnetic recording in the outward direction in the zone ZNI are shown. The change IIO in the assist/shingled magnetic recording density is larger than the change IOI in the assist/shingled magnetic recording density. That is, in the zone ZNI, the assist/shingled magnetic recording density assisted/shingled-magnetic-recorded in the outward direction is larger than the assist/shingled magnetic recording density assisted/shingled-magnetic-recorded in the inward direction. In the area IZR, the assist/shingled magnetic recording density BP31 with respect to the assist voltage VL3 is shown.

In the example illustrated in FIG. 6, the MPU 60 assists/shingled-magnetic-records data in the inward direction in the zone ZNO based on the change OOI in the assist/shingled magnetic recording density and the change OIO in the assist/shingled magnetic recording density as shown in the area OZR. When the data is assisted/shingled-magnetic-recorded in the inward direction in the zone ZNO, the assist/shingled magnetic recording densities BP11 and BP12 are saturated at the assist voltages VL2 and VL3 within the voltage range. Therefore, the MPU 60 performs the assist/shingled magnetic recording by applying the lowest assist voltage VL2 among the assist voltages VL2 and VL3 to the spin torque oscillator 200 as the saturation assist voltage. Note that since the assist/shingled magnetic recording density is not saturated at the assist voltage within the voltage range due to the change OIO in the assist/shingled magnetic recording density when the data is assisted/shingled-magnetic-recorded in the outward direction in the zone ZNO, the MPU 60 performs the assist/shingled magnetic recording by applying the assist voltage VL3 to the spin torque oscillator 200.

In the example illustrated in FIG. 6, the MPU 60 assists/shingled-magnetic-records data in the inward direction in the zone ZNM based on the change MOI in the assist/shingled magnetic recording density and the change MIO in the assist/shingled magnetic recording density as shown in the area MZR. When the data is assisted/shingled-magnetic-recorded in the inward direction in the zone ZNM, the assist/shingled magnetic recording densities BP21 and BP22 are saturated at the assist voltages VL2 and VL3 within the voltage range. Therefore, the MPU 60 performs the assist/shingled magnetic recording by applying the lowest assist voltage VL2 among the assist voltages VL2 and VL3 to the spin torque oscillator 200 as the saturation assist voltage. When the data is assisted/shingled-magnetic-recorded in the outward direction in the zone ZNM, the assist/shingled magnetic recording density is not saturated at the assist voltage within the voltage range due to the change MIO in the assist/shingled magnetic recording density. Therefore, the MPU 60 performs the assist/shingled magnetic recording by applying the assist voltage VL3 to the spin torque oscillator 200.

In the example illustrated in FIG. 6, the MPU 60 assists/shingled-magnetic-records data in the outward direction in the zone ZNI based on the change IIO in the assist/shingled magnetic recording density and the change IOI in the assist/shingled magnetic recording density as shown in the area IZR. When the data is assisted/shingled-magnetic-recorded in the outward direction in the zone ZNI, the assist/shingled magnetic recording density BP31 is not saturated at the maximum assist voltage VL3 within the voltage range, the MPU 60 performs the assist/shingled magnetic recording by applying the maximum assist voltage VL3 to the spin torque oscillator 200. When the data is assisted/shingled-magnetic-recorded in the inward direction in the zone ZNI, the assist/shingled magnetic recording density is not saturated at the assist voltage within the voltage range due to the change IOI in the assist/shingled magnetic recording density. Therefore, the MPU 60 may perform the assist/shingled magnetic recording by applying the assist voltage VL3 to the spin torque oscillator 200. In addition, when the change in the assist/shingled magnetic recording density with respect to the assist voltage in the case of the assist/shingled magnetic recording in the outward direction in a particular zone, for example, in a particular zone of the middle circumferential region MR intersects with the change in the assist/shingled magnetic recording density with respect to the assist voltage in the case of the assist/shingled magnetic recording in the inward direction, the MPU 60 may perform the assist/shingled magnetic recording by increasing the assist voltage within the voltage range or decreasing the assist voltage so as to increase the assist/shingled magnetic recording density. In other words, when the magnitude of the assist/shingled magnetic recording density with respect to the assist voltage in the case of the assist/shingled magnetic recording in the outward direction in a particular zone is reversed with the magnitude of the assist/shingled magnetic recording density with respect to the assist voltage in the case of the assist/shingled magnetic recording in the inward direction, the MPU 60 performs the assist/shingled magnetic recording by applying the maximum assist voltage within the voltage range, at which the assist/shingled magnetic recording density is maximum, to the spin torque oscillator 200.

FIG. 7 is a flowchart illustrating an example of write processing according to the present embodiment.

The MPU 60 starts write processing and evaluates the shingled magnetic recording density in both directions (outward and inward directions) while shaking the assist voltage in each radius area of the disk 10 (B701). The MPU 60 determines whether the maximum recording density differs depending on the shingled magnetic recording direction in a particular radius area (B702). When it is determined that the maximum recording density differs depending on the shingled magnetic recording direction in the particular radius area (Yes in B702), the MPU 60 calculates the assist voltage for performing the assist/shingled magnetic recording in the high density direction in the particular radius area (B703). The MPU 60 determines whether there is a saturation assist voltage within the voltage range when the assist/shingled magnetic recording is performed in the high density direction in the particular radius area (B704). When it is determined that there is no saturation assist voltage in the voltage range (No in B704), the MPU 60 applies the maximum assist voltage in the voltage range to the spin torque oscillator 200 (B705) and ends the processing. When it is determined that there is a saturation assist voltage in the voltage range (Yes in B704), the MPU 60 determines whether there are a plurality of saturation assist voltages in the voltage range (B706). When it is determined that there are no plurality of saturation assist voltages in the voltage range (No in B706), the MPU 60 applies the saturation assist voltage in the voltage range to the spin torque oscillator 200 (B707) and ends the processing. When it is determined that there are the plurality of saturation assist voltages in the voltage range (Yes in B706), the MPU 60 applies the saturation assist voltage which is lowest of the plurality of saturation assist voltages to the spin torque oscillator 200 (B708) and ends the processing. When it is determined that the maximum recording density is the same depending on the shingled magnetic recording direction in the particular radius area (No in B702), the MPU 60 calculates the assist voltage for performing the assist/shingled magnetic recording in both directions in the particular radius area (B709), performs the processing of B704 to B708, and adopts the shingled magnetic recording direction with a low assist voltage to be set (B710), and ends the processing.

According to the present embodiment, the magnetic disk device 1 includes the main magnetic pole 171, the write shield 172 facing the main magnetic pole 171 with a write gap in between, the recording coil 180 for exciting the recording magnetic field in the magnetic circuit including the main magnetic pole 171 and the write shield 172, and the spin torque oscillator 200 provided in the write gap. When the assist/shingled magnetic recording density in the particular radius area differs depending on the shingled magnetic recording direction, the magnetic disk device 1 performs the assist/shingled magnetic recording in the high density direction in the particular radius area. When the assist/shingled magnetic recording is performed in the particular shingled magnetic recording direction in the particular radius area where there is no saturation assist voltage within the voltage range, the magnetic disk device 1 applies the maximum assist voltage within the voltage range to the spin torque oscillator 200. When the assist/shingled magnetic recording is performed in the particular shingled magnetic recording direction in the particular radius area where there is a saturation assist voltage within the voltage range, the magnetic disk device 1 applies the saturation assist voltage within the voltage range to the spin torque oscillator 200. When the assist/shingled magnetic recording is performed in the particular recording direction in the particular radius area where there are a plurality of saturation assist voltages within the voltage range, the magnetic disk device 1 applies the saturation assist voltage which is lowest of the plurality of saturation assist voltages within the voltage range to the spin torque oscillator 200. Therefore, the magnetic disk device 1 can improve the recording density.

Further, the magnetic disk device 1 can adjust the strength of the assist effect by adjusting the assist voltage applied to the spin torque oscillator 200, and can suppress the load on the spin torque oscillator 200. Therefore, the magnetic disk device 1 can improve the life of the spin torque oscillator 200.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a disk;
   a head comprising a main magnetic pole having a first end and a second end opposite to the first end in a radial direction of the disk, a write shield facing the main magnetic pole with a gap, and an assist element provided in the gap and at a position where a first distance between the first end and the assist element and a second distance between the second end and the assist element are different from each other; and
   a controller which controls a voltage applied to the assist element according to a shingled write direction in which a second track is overwritten on a first track,
   wherein
   the controller applies, to the assist element, a second voltage, which is a lowest of a plurality of first voltages at which the recording density is saturated when the second track is overwritten on the first track in the write direction.

2. A magnetic disk device comprising:
   a disk;
   a head comprising a main magnetic pole having a first end and a second end opposite to the first end in a radial direction of the disk, a write shield facing the main magnetic pole with a gap, and an assist element provided in the gap and at a position where a first distance between the first end and the assist element and a second distance between the second end and the assist element are different from each other; and a controller which controls a voltage applied to the assist element according to a shingled write direction in which a second track is overwritten on a first track, wherein the controller applies, to the assist element, a third voltage, which is a highest of a plurality of second voltages lower than a first voltage at which a recording density is saturated when the second track is overwritten on the first track in the write direction.

3. A magnetic disk device comprising:

a disk;

a head comprising a main magnetic pole having a first end and a second end opposite to the first end in a radial direction of the disk, a write shield facing the main magnetic pole with a gap, and an assist element provided in the gap and at a position where a first distance between the first end and the assist element and a second distance between the second end and the assist element are different from each other; and a controller which controls a voltage applied to the assist element according to a shingled write direction in which a second track is overwritten on a first track, wherein when a second recording density of a first area in which the second track is overwritten in a second direction opposite to a first direction of the first track is higher than a first recording density of the first area in which the second track is overwritten in the first direction within the write direction of the first track, the controller overwrites the second track in the second direction of the first track in the first area.

* * * * *